United States Patent
Kemisetti et al.

(10) Patent No.: US 11,372,756 B2
(45) Date of Patent: Jun. 28, 2022

(54) MEMORY POOL MANAGEMENT

(71) Applicant: QUALCOMM Incorporated, San Diego, CA (US)

(72) Inventors: Rajesh Kemisetti, Hyderabad (IN); Joseph Gee, Longmont, CO (US); Rex Perkins, Medway, MA (US); Surendra Nallam, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/024,639

(22) Filed: Sep. 17, 2020

(65) Prior Publication Data

US 2022/0083464 A1 Mar. 17, 2022

(51) Int. Cl.
*G06F 12/02* (2006.01)
*G06F 12/0871* (2016.01)
*G06F 9/50* (2006.01)
*G06F 12/0811* (2016.01)
*G06F 12/0882* (2016.01)

(52) U.S. Cl.
CPC ........ *G06F 12/0246* (2013.01); *G06F 9/5016* (2013.01); *G06F 12/0811* (2013.01); *G06F 12/0871* (2013.01); *G06F 12/0882* (2013.01)

(58) Field of Classification Search
CPC ............. G06F 12/0811; G06F 12/0871; G06F 9/5016; G06F 12/0246; G06F 12/0882
USPC ........................................................ 711/154
See application file for complete search history.

(56) References Cited

U.S. PATENT DOCUMENTS

| 9,558,297 B1 * | 1/2017 | Bailey ................... G06F 12/023 |
| 2019/0050344 A1 * | 2/2019 | Puthiyedath ........ G06F 12/0653 |
| 2020/0042731 A1 * | 2/2020 | Kim ...................... G06F 16/252 |

OTHER PUBLICATIONS

Gaztanagal., "Memory allocation algorithms," Boost C++ Libraries, Copyright ©2005-2015, 2 pages.

* cited by examiner

*Primary Examiner* — Hua J Song
(74) *Attorney, Agent, or Firm* — Arent Fox, LLP (57) ABSTRACT

Adding, by a memory management process executing in a computing device, a physical address of each of a plurality of available blocks of memory to a binary search tree based on the physical address. After the adding, receiving, by the memory management process, a request for a memory allocation, the memory allocation to be from the plurality of available blocks. Allocating, by the memory management process and in response to the request, blocks of memory in physical address order from the binary search tree.

20 Claims, 5 Drawing Sheets

MEMORY POOL MANAGEMENT

BACKGROUND

Technical Field

The present disclosure relates generally to processing systems, and more particularly in some examples, to management of memory pools.

INTRODUCTION

Computing devices often perform graphics processing (e.g., utilizing a graphics processing unit (GPU)) to render graphical data for display by the computing devices. Such computing devices may include, for example, computer workstations, mobile phones such as smartphones, embedded systems, personal computers, tablet computers, and video game consoles. GPUs are configured to execute a graphics processing pipeline that includes one or more processing stages which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A device that provides content for visual presentation on a display may utilize a GPU.

SUMMARY

The following presents a simplified summary of one or more aspects in order to provide a basic understanding of such aspects. This summary is not an extensive overview of all contemplated aspects of the technology disclosed herein. The summary is intended neither to identify key or critical elements of all aspects nor to delineate the scope of any or all aspects, but to present some concepts in a simplified form as a prelude to the more detailed description that is presented later.

In some aspects of the disclosure, methods, computer-readable media, and apparatuses are described. In some aspects, a memory management process executing in a computing device adds a physical address of each of a plurality of available blocks of memory to a binary search tree based on the physical address. After adding the physical addresses to the binary search tree, the memory management process receives a request for a memory allocation, the memory allocation to be from among the plurality of available blocks. The memory management process then allocates, in response to the request, blocks of memory in physical address order from the binary search tree.

In some aspects, the binary search tree is a red-black tree. In some aspects, the allocation begins with one of: the root node of the binary search tree, or the lowest physical memory address contained in the binary search tree. In some aspects, adding the physical address to a binary search tree includes adding only the addresses of blocks of a same logical page order from among a plurality of logical page orders. In some aspects, after the memory management process allocates blocks of memory, the memory management process rebalances the binary search tree.

In some aspects, the memory management process executes on a central processing unit (CPU) of a system on a chip (SoC). In such aspects, the request is a request for user space system memory of the SoC to be used by one or more processes of a graphics processing unit (GPU) of the SoC. In some such aspects, the memory management process executes as a memory pool process in a kernel process of the CPU. In some such aspects, the memory management process communicates the allocation to the GPU.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented, or a method may be practiced, using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description.

The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SoC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

In examples, the term "display content," as used herein, may refer to content that is processed and/or output by a processing unit configured to perform display processing. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame when the frame includes two or more layers. Alternatively, a frame that includes two or more layers may subsequently be blended.

In typical computing systems, over time pages of a given logical page order (typically larger than physical page order) tend to get fragmented/scattered in the memory layout because of too many allocations and frees from various processes. Subsequently, it can be unlikely to get contiguous higher order pages such as 1 megabyte (MB). Similarly, in KGSL, over time the pages tend to be more scattered for any given application.

Some recent memory technologies, e.g., double data rate (DDR) memory and low-power DDR5 (LPDDR5) memory may be more efficient while working with more contiguous logical pages compared to similar number of pages which are scattered. In effect, GPU-to-memory efficiency while fetching data from those scattered pages goes down compared to fetching data from contiguous pages.

In some aspects of the technology disclosed herein, a memory management process executing in a computing device adds a physical address of each of a plurality of available blocks of memory to a binary search tree based on the physical address. After adding the physical addresses to the binary search tree, the memory management process receives a request for a memory allocation, the memory allocation to be from among the plurality of available blocks. The memory management process then allocates, in response to the request, blocks of memory in physical address order from the binary search tree.

Figure 1:
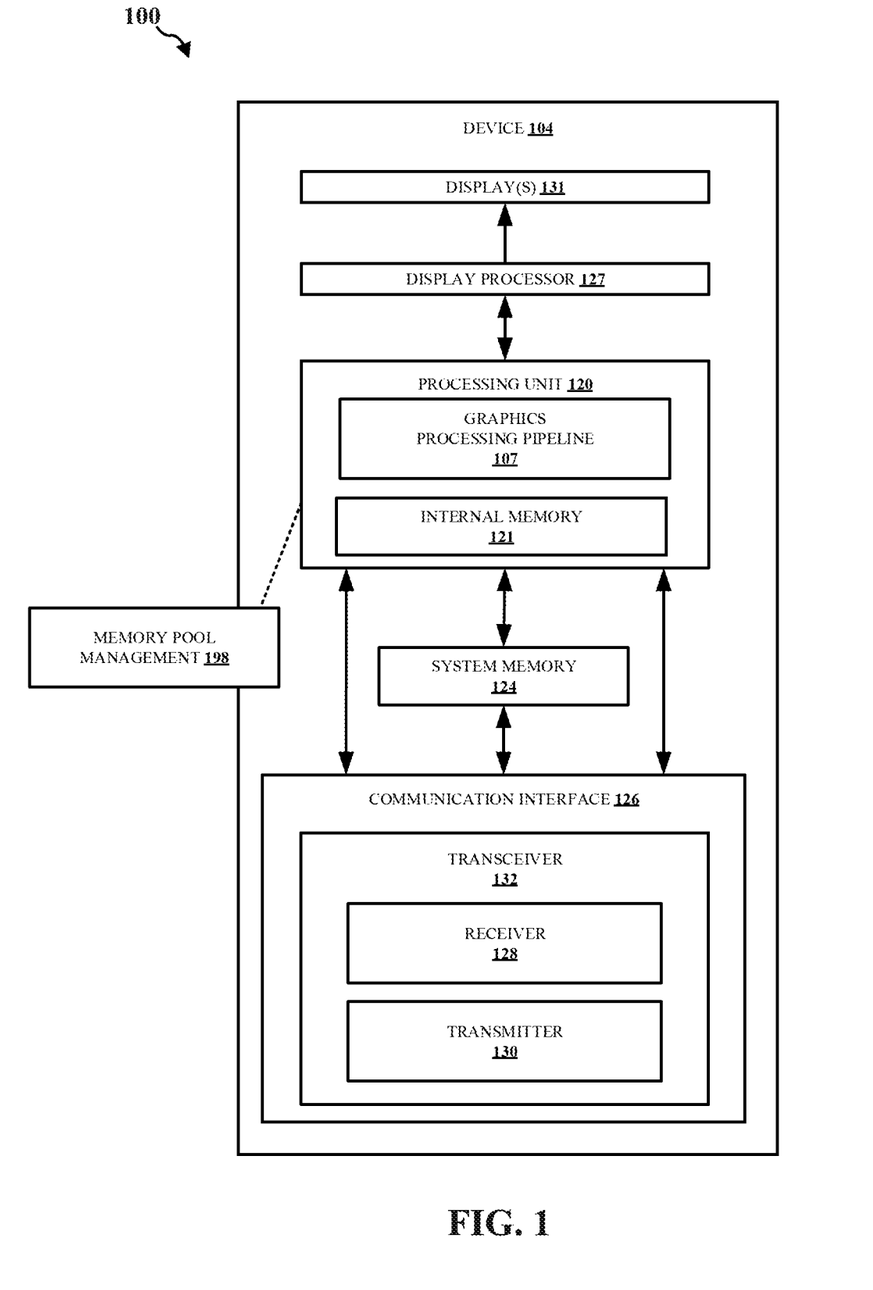
FIG. 1 is a block diagram that illustrates an example content generation system in accordance with one or more techniques of this disclosure.

FIG. 1 is a block diagram that illustrates an example content generation system 100 configured to implement one or more techniques of this disclosure. The content generation system 100 includes a device 104. The device 104 includes one or more components or circuits for performing various functions described herein. In some examples, one or more components of the device 104 may be components of an SoC. In the example shown, the device 104 includes a processing unit 120, and a system memory 124. As shown, the device 104 includes a communication interface 126, a transceiver 132, a receiver 128, a transmitter 130, a display processor 127, and one or more displays 131. For example, the display 131 may include a single display or multiple displays, which may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

As shown, the processing unit 120 includes an internal memory 121. The processing unit 120 is configured to perform graphics processing using a graphics processing pipeline 107. In the present example, the device 104 includes a display processor 127 to perform one or more display processing techniques on one or more frames generated by the processing unit 120 before being displayed by the one or more displays 131. The display processor 127 is configured to perform one or more display processing techniques on one or more frames generated by the processing unit 120. The one or more displays 131 are configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, is accessible to the processing unit 120. For example, the processing unit 120 is configured to read from and/or write to external memory, such as the system memory 124. The processing unit 120 is communicatively coupled to the system memory 124 over a bus. The internal memory 121 and the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory.

The internal memory 121 or the system memory 124 is a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 is integrated into a motherboard of the device 104. In further examples, the processing unit 120 is present on a graphics card that is installed in a port of the motherboard of the device 104 or is otherwise incorporated within a peripheral device configured to interoperate with the device 104. The processing unit 120 may include one or more processors, such as one or more microprocessors, CPUSs, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 stores instructions for the software in a suitable, non-transitory computer-readable storage medium, e.g., internal memory 121, and executes the instructions in hardware using one or more processors to perform the techniques of this disclosure. Any of the foregoing, including hardware, software, a combination of hardware and software, etc., may be considered to be one or more processors.

The content generation system 100 includes a communication interface 126. The communication interface 126 include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments Referring again to FIG. 1, in certain aspects of the technology disclosed herein, the processing unit 120 includes a memory pool management 198, e.g., included in a Kernel Graphic Support Layer (KGSL), configured to add a physical address of each of a plurality of available blocks of memory to a binary search tree based on the physical address. In some examples, the blocks under management by the memory pool management 198 are first allocated from system memory 124 (or other memory) by an operating system (OS) of device 104. Use of a memory management component, e.g., a KGSL-managed pool of memory already allocated from the OS, helps avoid the high transaction/latency cost (e.g., from the perspective of a graphics pipeline 107) of allocating memory from the OS itself.

After adding the physical addresses to the binary search tree, the memory pool management 198 receives a request for a memory allocation, the memory allocation to be from among the plurality of available blocks. The memory pool management 198 then allocates, in response to the request, blocks of memory in physical address order from the binary search tree.

In some aspects, the binary search tree is a red-black tree. In some aspects, the allocation begins with one of: the root node of the binary search tree, or the lowest physical memory address contained in the binary search tree. In some aspects, adding the physical address to a binary search tree includes adding only the addresses of blocks of a same logical page order from among a plurality of logical page orders. In some aspects, after the memory pool management process 198 allocates blocks of memory, the memory pool management process 198 rebalances the binary search tree.

In some aspects, the memory pool management 198 executes on a central processing unit (CPU) of a system on a chip (SoC). In such aspects, the request is a request for user space system memory of the SoC to be used by one or more processes of a graphics processing unit (GPU) of the SoC. In some such aspects, the memory pool management 198 executes as a memory pool process in a kernel process of the CPU. In some such aspects, the memory pool management 198 communicates the allocation to the GPU.

Figure 2:
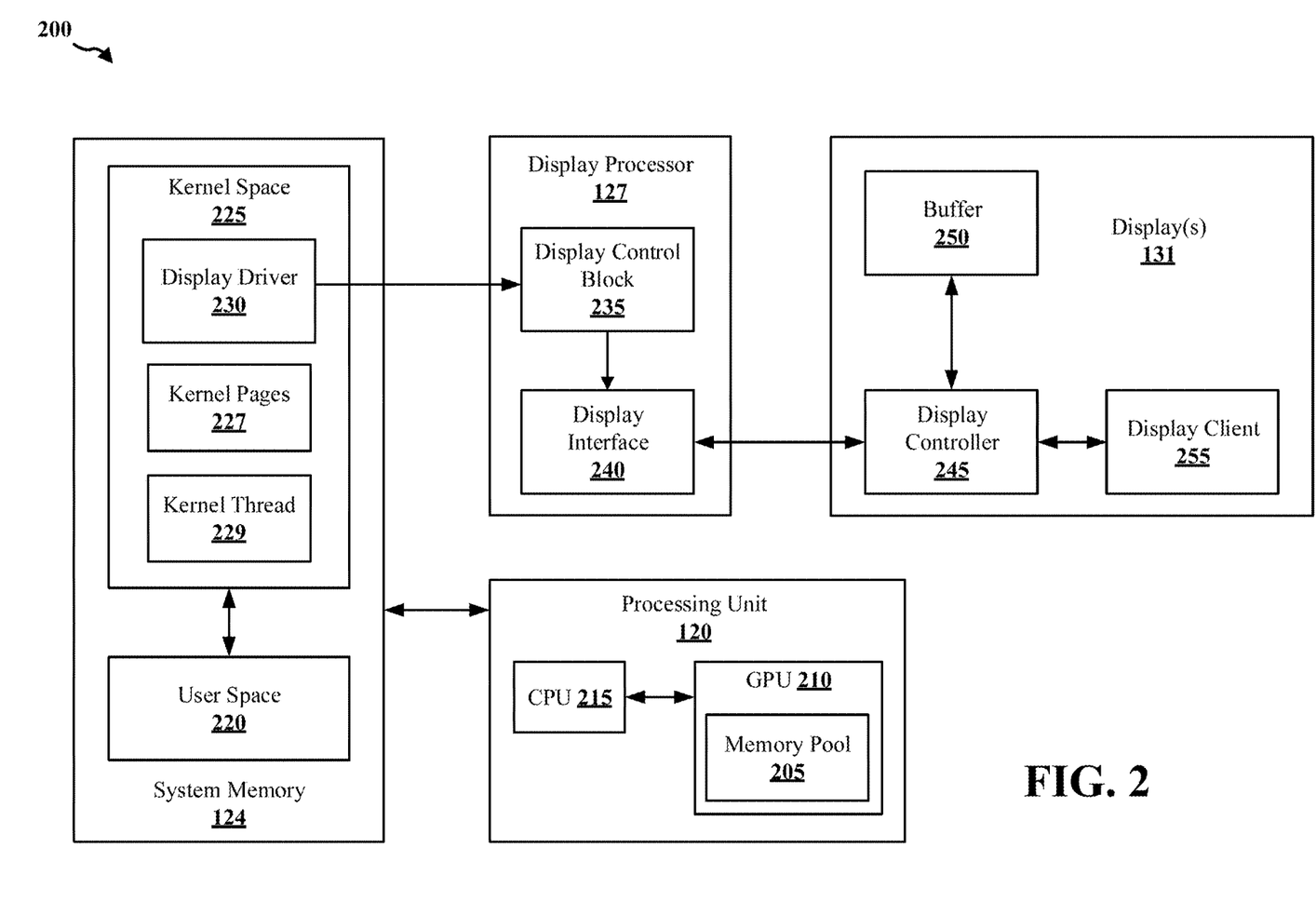
FIG. 2 is a block diagram that illustrates an example display framework for a content generation device, in accordance with one or more techniques of this disclosure.

FIG. 2 is a block diagram 200 that illustrates an example display framework related to processing unit 120, the system memory 124, the display processor 127, and the display(s) 131, as may be identified in connection with the exemplary device 104.

A GPU is generally included in devices that provide content for visual presentation on a display. For example, the processing unit 120 may include a GPU 210 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 210 may be controlled based on one or more graphics processing commands provided by a CPU 215. The CPU 215 may be configured to execute multiple applications concurrently. In some cases, each of the concurrently executed multiple applications may utilize the GPU 210 simultaneously. Processing techniques may be performed via the processing unit 120 to output a frame over physical or wireless communication channels.

The system memory 124, which may be executed by the processing unit 120, may include a user space 220 and a kernel space 225. The user space 220 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 225 further includes a display driver 230. The display driver 230 may be configured to control the display processor 127. For example, the display driver 230 may cause the display processor 127 to change a display rate (e.g., in frames per second (FPS)) of generated frames.

The GPU 210 may include memory that may be allocated to an application executed in the user space 220, so that the application may write to the pages. A kernel thread 229 included in the kernel space 225 may be executed in the background with respect to an application thread executed in the user space 220. The kernel thread 229 is configured to clear/zero one or more non-zeroed pages from the second sub-pool and generate/provide the cleared/zeroed pages to the first sub-pool as one or more zeroed pages. The one or more zeroed pages may then be allocated to the application executed in the user space 220. A size of the memory pool 205 may be increased or decreased based on respective addition or removal of pages from the memory pool 205. More specifically, the size of the memory pool 205 may be increased (e.g., during initialization of the memory pool 205) or decreased (e.g., based on performance/efficiency purposes) by adding/removing kernel pages 227 included in the system memory 124 to/from the memory pool 205.

The display processor 127 includes a display control block 235 and a display interface 240. The display processor 127 may be configured to manipulate functions of the display(s) 131 (e.g., based on an input received from the display driver 230). For instance, the display control block 235 may be configured to receive instructions from the display driver 230 to change the FPS display rate of the display(s) 131. The display control block 235 may be further configured to output image frames to the display(s) 131 via the display interface 240 based on a display refresh rate determined by the display driver 230. The display driver 230 may output refresh rate information indicating a new display refresh rate/change to a current the display refresh rate. The display control block 235 may receive the refresh rate information and cause the display interface 240 to output image frames to the display(s) 131 based on the refresh rate information. In some examples, the display control block 235 may additionally or alternatively perform post-processing of image data provided based on execution of the system memory 124 by the processing unit 120.

The display interface 240 may be configured to cause the display(s) 131 to display image frames and/or establish a particular display rate at which the display(s) 131 displays the image frames (e.g., a particular FPS display rate). The display interface 240 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 250.

Frames are displayed at the display(s) 131 based on a display controller 245, a display client 255, and the buffer 250. The display controller 245 may receive image data from the display interface 240 and store the received image data in the buffer 250. In some examples, the display controller 245 may output the image data stored in the buffer 250 to the display client 255. Thus, the buffer 250 may represent a local memory to the display(s) 131. In some examples, the display controller 245 may output the image data received from the display interface 240 directly to the display client 255. It should be further appreciated that determining whether to change the FPS display rate of the display(s) 131 may be performed by the display controller 245, the display control block 235, and/or the display driver 230.

The display client 255 may be associated with a touch panel that senses interactions between a user and the display(s) 131. As the user interacts with the display(s) 131, one or more sensors in the touch panel may output signals to the display controller 245 that indicate which of the one or more sensors have sensor activity, a duration of the sensor activity, an applied pressure to the one or more sensors, etc. The display controller 245 may use the sensor outputs to determine a manner in which the user has interacted with the display(s) 131. The display(s) 131 may be further associated with/include other devices, such as a camera, a microphone, and/or a speaker, that operate in connection with the display client 255.

A memory pool, for example, a portion of system memory 124, may be managed by a kernel graphics services layer (KGSL) executing on a CPU 215 in an system on a chip (SoC) of device 104. The KGSL is used to manage resources like memory, power, and state management for GPUs 210 running graphics processing pipeline 107. KGSL may allocate requested memory from a pool of memory, already assigned to KGSL by the device 104 OS, by aligning the request to the nearest greater one of a discrete number of logical page orders, e.g., 4 kilobytes (kB), 8 kB, 64 kB or 1 MB, or to multiples thereof.

A user-mode display (UMD) driver executed based on, for example, an open computing language (OpenCL), an open graphics library (OpenGL), etc., may call the KGSL driver to allocate the memory for the GPU. The UMD generally causes the KGSL driver to allocate memory from the KGSL memory pool, when available, for purposes of resource utilization efficiency. However, if memory cannot be allocated from the KGSL memory pool (e.g., because the memory pool is empty), the KGSL driver may allocate additional memory from the kernel system memory.

KGSL manages memory pools with the above-mentioned logical page orders to meet application request for memory without waiting for device 104 OS memory management to allocate such memory—since the device 104 OS has already identified the memory in the pool as allocated to KGSL, typically in 2 kB physical page blocks/frames. This approach can reduce some of the latencies involved in getting physical memories assigned to GPU processes from underlying buddy allocations. A buddy memory allocation divides memory into partitions to try to satisfy a memory request as suitably as possible, making use of splitting memory into halves to try to give a best fit. KGSL Memory pools are managed in such a way that few of the higher order pages are reserved upfront and the number of such pages drawn from the device 104 system memory 124 is not allowed to grow. Once this limited number of higher order reserved pages are allocated from KGSL, then KGSL tries to allocate from lower order pools, which can grow without a KGSL cap.

In typical computing systems, over time pages of a given logical page order (typically larger than physical page order) tend to get fragmented/scattered in the memory layout because of too many allocations and frees from various processes. Subsequently, it can be unlikely to get contiguous higher order pages such as 1 MB. Similarly, in KGSL, over the time the pages tend to be more scattered for any given application.

Some recent memory technologies, e.g., double data rate (DDR) memory and low-power DDR5 (LPDDR5) memory may be more efficient while working with more contiguous logical pages compared to similar number of pages which are scattered. In effect, GPU-to-memory efficiency while fetching data from those scattered pages goes down compared to fetching data from contiguous pages.

Figure 3:
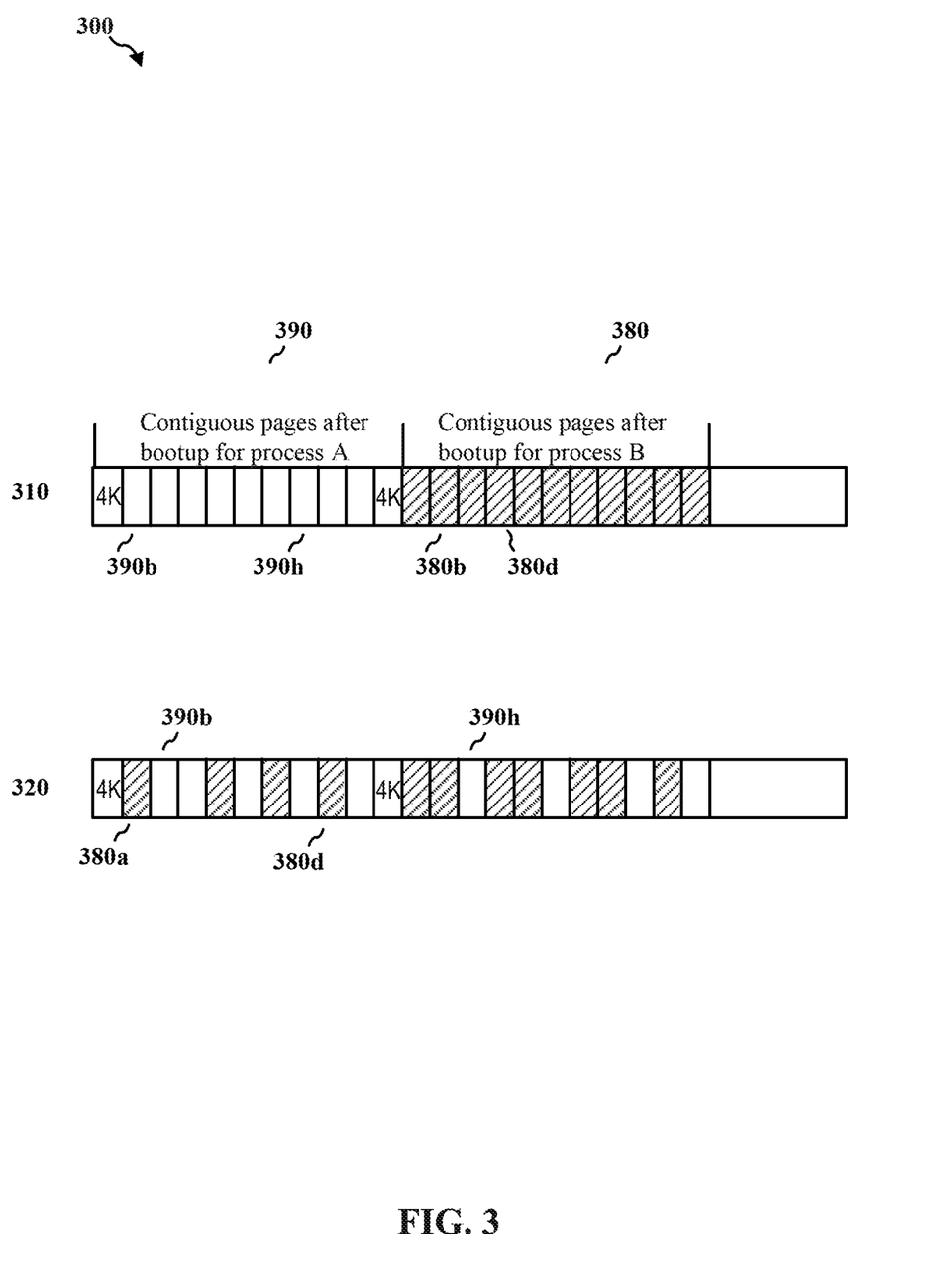
FIG. 3 is an example of typical memory allocation to two processes over time within the display framework, in accordance with one or more techniques of this disclosure.

Referring to FIG. 3, and continuing to refer to prior figures for context, an example of typical memory allocation to two processes over time 300 is shown. Two processes—A and B—are shown. Both processes request 44 kB of system memory at system bootup 310. At system bootup 310 Process A is allocated eleven consecutive 4 kB logical pages 390a-390k (only 390b in the second 4 kB logical page and 390h in the eight 4 kB logical page are indicated), and Process B is allocated eleven consecutive 4 kB logical pages 380a-380k (only 380b in the twelfth 4 kB logical page and 380d are fourteenth 4 kB logical page indicated). At a later time 320, after instances of processes A and B have been closed (memory freed) and then opened (memory allocated) along with other processes being opened/closed, the allocation of 4 kB logical pages to new instances of processes A and B may be scattered. In the later time 320, memory allocation to Process A is in scattered 4 kB logical pages, e.g. 390b is now in the third 4 kB logical page and 390h in the fourteenth 4 kB logical page. Process B is also now allocated in a scattered fashion, e.g., 380a is now in the second 4 kB logical page and 380 is now in the ninth 4 kB logical page. In DDR-type memory, this behavior degrades device efficiency over time. For example, read/write cycles for a GPU 210 to DDR in system memory 124 take longer for a given process the more scattered among physical memory addresses that the memory allocated to the given process is.

Figure 4:
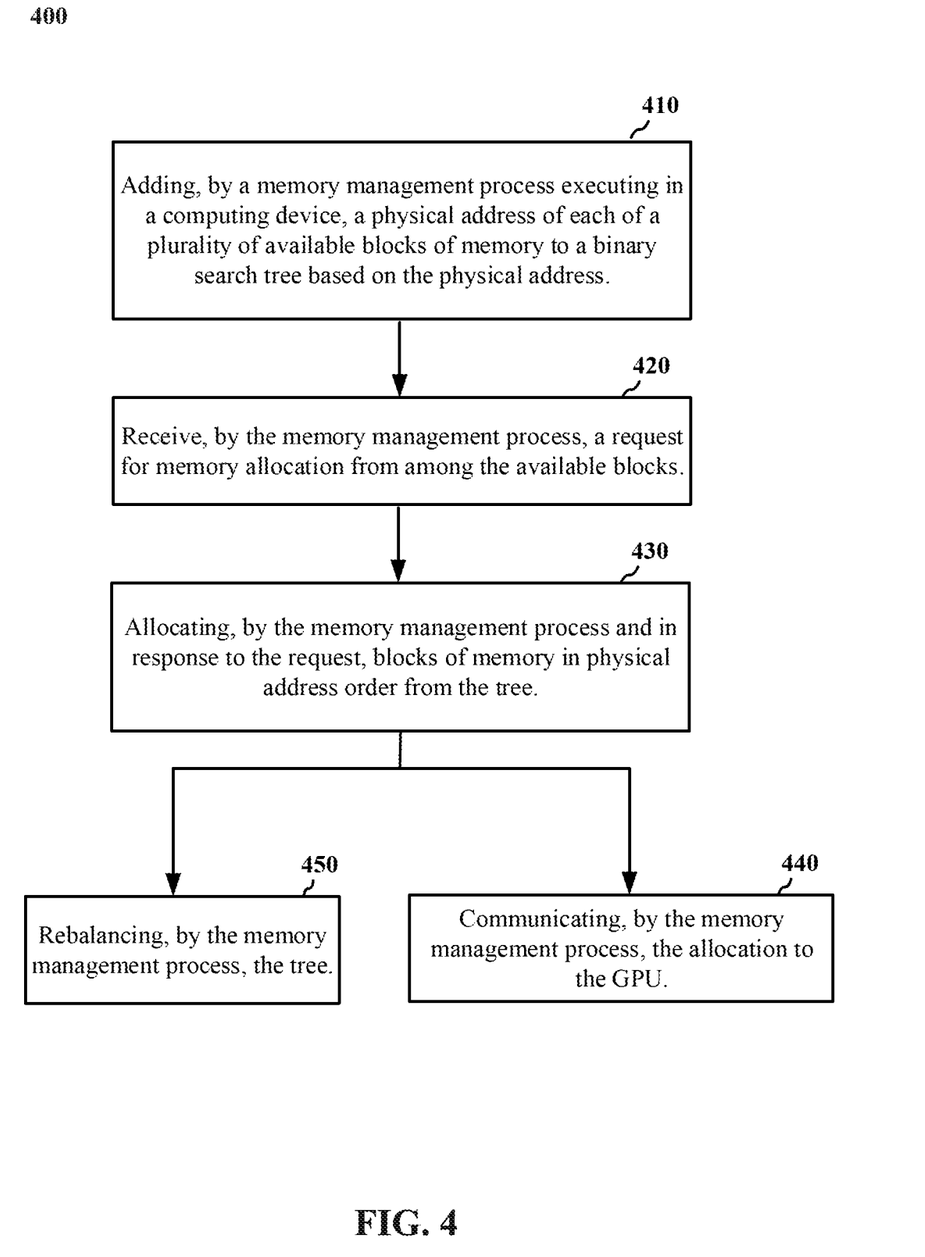
FIG. 4 is a flowchart of methods of data processing is shown, in accordance with one or more techniques of this disclosure.

Referring to FIG. 4, and continuing to refer to prior figures for context, a flowchart of methods 400 of data processing is shown, in accordance with examples of the technology disclosed herein. Such methods 400 allow a device such as device 104, and in particular GPU 210, to interact with memory more efficiently by allocating blocks of memory that are more contiguous than would otherwise be the case absent the technology disclosed herein.

In such methods 400, a memory management process executing on a computing device, adds a physical address of each of a plurality of available blocks of memory to a binary search tree based on the physical address—Block 410.

A binary search tree is a data structure formed as a rooted tree wherein each node stores a key i) that is greater than all keys in the node's left subtree, and ii) that is less than all the keys in the node's right subtree. The arrangement of nodes in a binary search tree means that each branch divides about half of the remaining tree—resulting in a lookup that takes a number of operations proportional to the binary logarithm of the number of items stored in the binary search tree—much less than the linear time/number of operations to find items by key in an unsorted array. In addition, efficient methods for inserting and deleting nodes from a binary search tree, and for rebalancing the binary search tree, are known.

Figure 5:
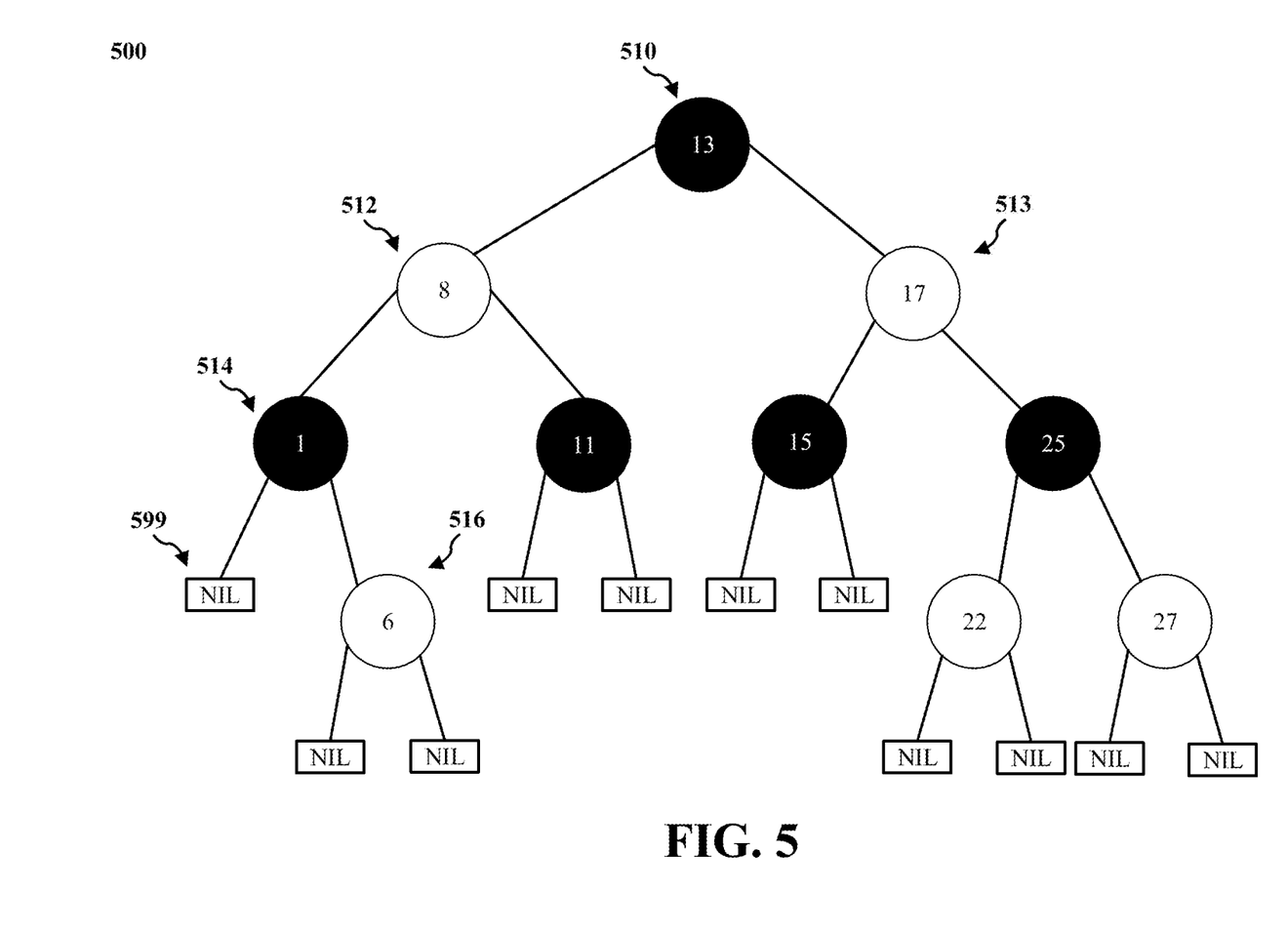
FIG. 5 is a notional binary search tree, in accordance with one or more techniques of this disclosure.

Referring to FIG. 5, and continuing to refer to prior figures for context, a notional binary search tree 500 is illustrated. Binary search tree 500 is a self-balancing red-black tree for logical pages memory of 4 kB page order. In a red-black tree, in addition to a key, each node is characterized by one of two "colors" (red or black in this case—though shown in FIG. 5 as white and black). The color of a node is used to facilitate balancing of the binary search tree, e.g., upon insertion (memory block freed/available) or deletion (memory block allocated) of a node. In FIG. 5, the root node 510 of binary search tree 500 is black and carries the key "13." All nodes in the left subtree of node 510 carry keys that are less than "13," e.g., node 512 is red and has a key of "8." All nodes in the right subtree of node 510 carry keys that are greater than "13," e.g., node 513 is red and has a key of "17." The leaf nodes, e.g., 599, of the binary search tree 500 do not carry data.

In a continuing example, the key for each node in the binary search tree 500 represents the physical address of an available block of memory. Since each available block of memory is associated with a unique address, all nodes in the binary search tree 500 will have a unique key. While the node keys of the continuing example are not strictly contiguous, note that as explained in connection with FIG. 3, on startup the device 104 can better allocate contiguous blocks of memory to a given process.

In the continuing example, the memory management process executes on an CPU 215 of an SoC of device 104 as a kernel graphics support layer (KGSL). The KGSL manages resources like memory, power, and state management for GPUs 210 running graphics processing pipeline 107. KGSL may allocate requested memory from a pool of memory, already assigned to KGSL by the OS of device 104, by aligning the request to the nearest one of a discrete number of logical page orders. In the continuing example, the logical page orders (based on 2 kB physical frame size for system memory 124) are 4 kB, 8 kB, 64 kB, and 1 MB. The KGSL maintains separate binary search trees (such as binary search tree 500 for memory blocks of 4 kB page order) for each page order.

Referring again to FIG. 4, the memory management process receives a request for a memory allocation, the memory allocation to be from among the available blocks—Block 420. In the continuing example, a user space application program executing on the CPU 215 requests, via KGSL as memory management process, 23 kB of user space memory 220 for use by GPU 210. The user space memory 220 available through KGSL (e.g., after an initial allocation from the device 104 operating system and some period of freeing and re-allocation) is managed by KGSL in one binary search tree for each memory logical page order, with binary search tree 500 identifying the addresses for available 4 kB logical page order pages.

The memory management process allocates blocks of memory in physical address order from the binary search tree in response to the request—Block 430. In the continuing example, the binary search tree maintained by KGSL for 8 kB page order memory blocks is empty, leaving 4 kB page order memory blocks as the largest order less than the request and the nearest page order to the request—regardless of the availability of memory blocks of 64 kB page order and 1 MB page order.

KGSL begins the allocation at the lowest address in the 4 kB order page red-black binary search tree 500, found as the key of the lowest left non-leaf node of the binary search tree 500—in this case at physical address "1" from node 514. KSGL proceeds in red-black binary search tree node order from node 514 down the binary search tree and to the left, encountering leaf 599 with "NIL" value, and then back through node 514 and down to the right, collecting the physical address "6" at node 516 for another 4 kB order page. KGSL continues up through node 514 to node 512, collecting the physical address "8" at node 512 for a third 4 kB order page. KGSL continues down and the right from node 512, collecting the physical address "11" as the address of the fourth 4 kB order page. KGSL continues up through node 512 to node 510, collecting the physical address "13" as the address of the fifth 4 kB order page—for a current total of 20 kB of memory. KGSL continues one more step in binary search tree order to node 513, collecting the physical address "17" as the address of the sixth, and final, 4 kB order page of memory for a total of 24 kB of memory across six 4 kB logical pages to respond to the 23 kB request. While the continuing example began the allocation at the lowest memory address in the binary search tree 500, other approaches can be used, including beginning at the root node or beginning at a node that would offer a strictly contiguous block to meet the request.

The memory management process communicates the allocation to the GPU—Block 440. In the continuing example, the KGLS running on the CPU 215 communicates the allocation of 4 kB logical blocks of system user space memory 220 having the addresses {1, 6, 8, 11, and 13} to the GPU 210. In some examples, the GPU will read application data from these locations, process the application data in the graphics processing pipeline, and write results to these locations to be used by the display processor 127 to develop information to send to the display(s) 131.

The memory management process rebalances the binary search tree—Block 450. In the continuing example, after allocating blocks of memory per the request in order from the binary search tree, the KGSL rebalances the red-black binary search tree 500 using existing methods. The memory management process can rebalance the binary search tree at other times, e.g., when the GPU 210 no longer needs the allocated memory and frees the pages, or at any other time known for triggering rebalancing of a binary search tree.

As a further example, an apparatus such as a wireless communication device 104, a frame composer, a display processor, a DPU, a GPU, an SoC, or other similar apparatus can implement memory pool management 198 described above. Memory pool management 198 uses a binary search tree to index pages of available memory for allocation to processes executing on the apparatus. Accordingly, memory pool management 198 may provide means for allocating available memory to processes executing on the apparatus using a binary search tree to index pages of such available memory.

Memory pool management 198 includes adding a physical address of each of a plurality of available blocks of memory to a binary search tree based on the physical address. Accordingly, an apparatus implementing memory pool management may provide means for adding a physical address of each of a plurality of available blocks of memory to a binary search tree based on the physical address. In some examples, the means for adding the physical address to a binary search tree includes means for adding only the addresses of blocks of a same logical page order from among a plurality of logical page orders.

Memory pool management 198 includes receiving a request for a memory allocation, the memory allocation to be from the plurality of available blocks. Accordingly, an apparatus implementing memory pool management 198 may provide means for receiving a request for a memory allocation, the memory allocation to be from the plurality of available blocks.

Memory pool management 198 includes allocating in response to the request, blocks of memory in physical address order from the binary search tree. Accordingly, an apparatus implementing memory pool management 198 may provide means for allocating, in response to the request, blocks of memory in physical address order from the binary search tree. In some examples, means for allocating includes adding the physical address to a binary search tree comprises, adding only the addresses of blocks of a same logical page order from among a plurality of logical page orders.

Memory pool management 198 includes communicating the allocation to a GPU. Accordingly, an apparatus implementing memory pool management may provide means for communicating the allocation to a GPU of the apparatus 602. Memory pool management 198 includes rebalancing the binary search tree. Accordingly, an apparatus implementing memory pool management 198 may provide means for rebalancing the binary search tree.

The apparatus may include additional components that perform each of the blocks of the algorithm in the aforementioned flowchart of FIG. 4. As such, each block in the aforementioned flowchart of FIG. 4 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interrupted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media can comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques could be fully implemented in one or more circuits or logic elements.

While examples used herein focus on a memory management process executing on a CPU in kernel space to allocate system user space memory to process(es) executed on a GPU, the disclosed technology has utility for any memory management process. In some examples, the technology disclosed herein seeks to allocate more-contiguous pages from the KGSL pools for given page order instead of giving randomly available pages. The technology disclosed herein also results in reusing other pages which are freed from different processes, and that now might become contiguous with existing memory in the KGSL pool, since the KGSL pool is common for all the clients or processes that are using the graphics user space driver of the device, e.g., device 104. In some cases, the device 104 enables KGSL pools with 4 kB, 8 kB, 64 kB and 1 MB order pages, and allows the number of pages of at least one page order (typically 4 kB) to grow without a low cap. Based on application memory requests, the technology selects different order pages as well.

Whenever a user space application requests a memory allocation for graphics processing, the technology will seek to allocated nearest order pages from system memory (initially) to map to the GPU. At boot up, the chances of getting contiguous pages are high. Once the application is done with its work, it releases those pages back to the KGSL pool as free for another allocation. In the present technology, instead of simply adding the released memory an a page-order-specific linked list in KGSL, the default list is replaced with either a red-black tree per pool or any other efficient binary search tree, which can insert the address for the released pages in-order based on their physical addresses. For given page, KGSL can get the physical address using kernel API. The physical address becomes the key for inserting the page to the red-black tree. After inserting new addresses (and at any other convenient time) the technology can use red-black tree APIs to re-balance the binary search tree. In a red-black tree, the addresses of memory pages are arranged based on physical address value. When a user space application requests memory, then based on the requested size the technology can select the nearest page order and in address order and allocate pages of memory that are more contiguous than would otherwise be the case.

Using Antutu or a similar kind of GPU-DDR heavy mobile phone performance benchmark test for repeatedly opening and closing user space applications, performance can be measured immediately after bootup (a higher number indicates a better score), and then after iterations of opening and closing user space applications. Under such a test, the present technology outperformed conventional technology as shown in TABLE 1.

TABLE 1

| Default (with KGSL mempools) | With rb_tree: Run1 | With rb_tree Run2 |
| --- | --- | --- |
| 88690 | 88629 | 89141 |
| 86505 | 89079 | 89017 |
| 86895 | 88711 | 88833 |
| 86564 | 88792 | 88752 |
| 85020 | 88670 | 88772 |
| 84741 | 88629 | 88854 |
| 84666 | 88792 | 88670 |
| 85058 | 88854 | 88792 |
| 85283 | 88629 | 88752 |
| 85377 | 88935 | 88690 |
| 84666 | 88813 | 88508 |
| 84537 | 88508 | 88589 |
| 84297 | 88772 | 88915 |

Various examples have been described. These and other examples are within the scope of the following claims.

What is claimed is:

1. A method of data processing, comprising:
adding, by a memory management process executing in a computing device, a physical address of each of a plurality of available blocks of memory to a binary search tree based on the physical address;
after the adding, receiving, by the memory management process, a request for a memory allocation, the memory allocation to be from the plurality of available blocks; and
allocating, by the memory management process and in response to the request, blocks of memory in physical address order from the physical addresses contained in the binary search tree.

2. The method of claim 1, wherein the binary search tree is a red-black tree.

3. The method of claim 1, wherein the allocation begins with one of a root node of the binary search tree or a lowest physical memory address contained in the binary search tree.

4. The method of claim 1, wherein adding the physical address to the binary search tree comprises, adding only the addresses of blocks of a same logical page order from among a plurality of logical page orders.

5. The method of claim 1, wherein:
the memory management process executes on a central processing unit (CPU) of a system on a chip (SoC); and
the request comprises a request for user space system memory of the SoC to be used by one or more processes of a graphics processing unit (GPU) of the SoC.

6. The method of claim 5, wherein the memory management process executes as a memory pool process in a kernel process of the CPU.

7. The method of claim 5, further comprising:
communicating, by the memory management process the allocation to the GPU.

8. An apparatus for data processing, comprising:
a memory; and
at least one processor coupled to the memory and configured to:
add, by a memory management process executing on the at least one processor, a physical address of each of a plurality of available blocks of memory to a binary search tree based on the physical address;
after the adding, receive, by the memory management process, a request for a memory allocation, the memory allocation to be from the plurality of available blocks; and
allocate, by the memory management process and in response to the request, blocks of memory in physical address order from the physical addresses contained in the binary search tree.

9. The apparatus of claim 8, wherein the binary search tree is a red-black tree.

10. The apparatus of claim 8, wherein the allocation begins with one of a root node of the binary search tree or a lowest physical memory address contained in the binary search tree.

11. The apparatus of claim 8, wherein adding the physical address to the binary search tree comprises, adding only the addresses of blocks of a same logical page order from among a plurality of logical page orders.

12. The apparatus of claim 8, wherein:
the memory management process executes on a central processing unit (CPU) of a system on a chip (SoC); and
the request comprises a request for user space system memory of the SoC to be used by one or more processes of a graphics processing unit (GPU) of the SoC.

13. The apparatus of claim 12, wherein the memory management process executes as a memory pool process in a kernel process of the CPU.

14. The apparatus of claim 12, further comprising:
communicating, by the memory management process the allocation to the GPU.

15. The apparatus of claim 8, wherein the apparatus is a wireless communication device.

16. A non-transitory computer-readable medium storing computer executable code, the code when executed by at least one processor, causes the at least one processor to:
- add, by a memory management process executing on the at least one processor, a physical address of each of a plurality of available blocks of memory to a binary search tree based on the physical address;
- after the adding, receive, by the memory management process, a request for a memory allocation, the memory allocation to be from the plurality of available blocks; and
- allocate, by the memory management process and in response to the request, blocks of memory in physical address order from the physical addresses contained in the binary search tree.

17. The computer-readable medium of claim 16, wherein the binary search tree is a red-black tree.

18. The computer-readable medium of claim 16, wherein the allocation begins with one of a root node of the binary search tree or a lowest physical memory address contained in the binary search tree.

19. The computer-readable medium of claim 16, wherein adding the physical address to the binary search tree comprises, adding only the addresses of blocks of a same logical page order from among a plurality of logical page orders.

20. The computer-readable medium of claim 16, wherein:
the memory management process executes on a central processing unit (CPU) of a system on a chip (SoC); and the request comprises a request for user space system memory of the SoC to be used by one or more processes of a graphics processing unit (GPU) of the SoC.

* * * * *